United States Patent Office 3,351,008

Patented Nov. 7, 1967

3,351,008

COMPOSITION FOR TREATMENT OF IMAGED LITHOGRAPHIC MASTERS AND METHOD OF USE

Seamon A. Lincoln, Wheaton, and George M. Ort, Chicago, Ill., assignors to A. B. Dick Company, Niles, Ill., a corporation of Illinois No Drawing. Filed Dec. 6, 1965, Ser. No. 512,017
7 Claims. (Cl. 101—465)

This invention relates to the art of lithographic duplication, and more particularly to a method for treatment of imaged lithographic masters and to a new and improved composition for use in the practice of same.

This invention will be described with reference to the preparation of an imaged duplicating master formed of a light-sensitive, resin-forming diazo compound on a base of aluminum or other amphoteric metal surface treated to render the surface which underlies the diazo coating water-receptive, ink-repellent, and lithographic. It will be understood that the concepts of this invention will find application also in the treatment of other lithographic surfaces on which an ink-receptive, water-repellent imaging material has been applied either directly, as by ink, typewriter, crayon, pencil, die impression or the like, or indirectly from a transfer coating, by silver diffusion from an exposed negative, electrostatically, or the like.

In the case of the presensitized aluminum plate coated with a resin-forming, light-sensitive diazo compound, exposure of the light-sensitive diazo compound to ultraviolet through a negative transparency will bring about reaction of the resin-forming diazo compound to form an ink-receptive, water-repellent image in the exposed areas while the unreacted diazo compound in the unexposed areas is removable by desensitizer or other aqueous media applied by means of a swab, roller, or the like to expose the underlying water-receptive, ink-repellent, hydrophilic lithographic surface constituting the non-imaged portions of the plate. This is somewhat the same as an imaged plate formed of other coated paper lithographic plates and the like, wherein an ink-receptive, water-repellent imaging material comprises the imaged portion on the water-insoluble, water-receptive, ink-repellent hydrophilic lithographic surface which constitutes the non-imaged portion of the plate.

In many of the processes for preparing an imaged lithographic plate, the formed image is not visible until the plate is mounted on the lithographic press and inked for use in the production of copies. It is desirable to embody means in the imaging process which will result in the production of a visible image during preparation of the plate, so that the imaged master can be proof-read for correction before the plate is mounted on the press for the production of multiple copies.

The image that is developed, as in the presensitized diazo plate, is of insufficient strength and toughness to resist the wet abrasive action during use on the offset press for multiple copy reproduction. As a result the image wears off before the desirable large number of copies can be produced, as is desired in a long wearing plate. Thus it is also desirable to embody a means in the developing process which results in the production of an image on a lithographic master which is reinforced sufficiently to resist loss of the image before a large number of copies of good quality have been produced.

It is an object of this invention to provide a new and improved process for use in the preparation of an imaged master in which a readable image is produced on the plate; in which the image is reinforced more effectively to resist the wet abrasive action on the press to enable production of a larger number of copies of good quality; in which the imaged plate is free of such undesirable characteristics as coagulation, coalescence, and plugging of half-tones during the lacquering process; in which the intensity of the image is improved while, at the same time, increasing the water receptivity of the non-imaged portion of the plate, thereby to accent the desirable contrast between the ink-receptive, water-repellent, imaged portion and the ink-repellent, water-receptive non-imaged portion of the plate, and it is a related object to produce a new and improved composition for use in the practice of same.

Briefly described, an important concept of this invention resides in the step of wetting the imaged surface of the offset or lithographic master with an aqueous dispersion in which the dispersed phase contains as its essential ingredients an organic solvent which is essentially immiscible with water, a pigment or dyestuff, resinous material that is dissolved in the organic solvent, and in which the continuous phase contains as its essential ingredients a water-soluble hydrophilic colloid dissolved in the aqueous medium making up the continuous phase, a surface active agent, and a colloidal silica of the hydrophilic type.

In the preferred practice of this invention, the dispersed phase is formulated also to include a hydrophobic colloidal silical to constitute a dispersed phase which includes the solvent, the dissolved resinous material, the pigment and the hydrophobic colloidal silica. While the hydrophobic colloidal silica is not essential, it functions in combination with the dissolved resinous material further to strengthen the image.

In the described formulation, the pigment or color operates to develop visibility of the image, and while the hydrophobic colloidal silica is not essential, it has the effect of strengthening the image whereby a larger number of copies of good quality can be produced. In the continuous phase, the hydrophilic colloidal silica appears to enhance the water receptivity of the non-imaged portions of the plate and to clean the non-imaged portions whereby clean copy of good quality and images of higher intensity, without plugging of half-tones, are secured.

As the resinous material dissolved in the organic solvent, use is preferably made of condensation polymerization products of epichlorohydrin and a Novolak of ortho-cresol-formaldehyde although other similar resinous materials can be employed. When present, it is desirable to make use of the resinous material in an amount corresponding to 1–10 percent by weight and preferably 5–7 percent by weight of the total mix.

As the organic solvent, use can be made of a ketone such as methyl isobutyl ketone, ethyl butyl ketone, diisobutyl ketone and the like; an aromatic hydrocarbon such as toluene, xylene, benzene and the like; an ester such as isopropyl acetate, amyl acetate, butyl Cellosolve acetate and the like; chlorinated hydrocarbons such as carbon tetrachloride, ethylene dichloride, 1,2,3-trichloropropane, and the like, and combinations of the foregoing solvents. The organic solvent component may be present in the composition in an amount within the range of 10–40 percent by weight and preferably 20–30 percent by weight.

As the pigment or dyestuff, use can be made of inorganic pigments such as colored metallic chromates, ferrocyanides, oxides, hydroxides, silicates and the like; organic pigments such as toners or lakes of rhodamines, Victoria blue, methyl violet and the like; or insoluble azo pigments such as the toluidines, benzidines, Hansas, and the like; phthalocyanines; nigrosines; carbon blacks such as furnace black, channel black and the like; or dyes that are water-insoluble but soluble in the solvent present in the dispersed phase including spirit soluble dyes for use with the esters or ketones and oil soluble dyes for use with aromatic hydrocarbons and the chlorinated hydrocarbons. It is preferred to make use of the pigment or dyestuff in an amount within the range of 1.5 to 3 percent by weight of the treating composition but desirable results can be achieved when use is made of the pigment or dyestuff in an amount as little as 0.5 to an amount as great as 10 percent by weight.

The hydrophobic colloidal silica is organic surface modified colloidal silica represented by a product marketed by Nalco Chemical Company of Chicago, Illinois, as Colloidal Silica CD–100. The amount of hydrophobic colloidal silica in the treating composition may range from 0.01 to 1.0 percent by weight of the composition and it is preferred to make use of the hydrophobic colloidal silica in an amount within the range of 0.04 to 0.06 percent by weight.

As the hydrophilic colloid dissolved in the aqueous medium of the continuous phase, use can be made of a water-soluble substance such as gum tragacanth, gum arabic, guar gum, polyvinyl alcohol, water-soluble cellulose derivatives such as carboxymethyl cellulose, methyl cellulose and the like, alginates and the like. The hydrophilic protective colloid is embodied in the composition in an amount within the range of 1 to 10 percent by weight and preferably in an amount within the range of 2 to 4 percent by weight of the composition.

As the surface active agent, use is made of an anionic emulsifier such as Triton X–200 (Rohm & Haas Company) or other alkyl aryl sulfonates or nonionic emulsifiers such as Triton CF–10. Combinations of anionic and nonionic emulsifiers can be employed. It is sufficient when the surface active agent is present in the composition in an amount greater than 0.1 percent up to 4 percent by weight although amounts up to 10 percent by weight can be employed.

The hydrophilic colloidal silica present in the continuous phase is represented by a colloidal silica of the type marketed by E. I. du Pont de Nemours & Co. under the trade name "Ludox," or by Nalco Chemical Company under the trade name "Nalcoag." The colloidal silica can be employed in the composition in an amount within the range of 0.1 to 10 percent by weight and preferably 2.5 to 5 percent by weight of the composition.

While not essential, benefits are derived when the dispersed phase is formulated also to contain a masking agent such as a deodorant, perfume or the like. When employed, such masking agent can be embodied in trace amounts up to 1 percent by weight of the treating composition, depending somewhat upon the strength and character of the masking agent.

The following is representative of a treating composition embodying the practice of this invention:

*Example 1*

| Material.—(A) Dispersed phase: | Percent by weight |
|---|---|
| Epichlorohydrin and Novolak of ortho-cresol-formaldehyde (Kopox 737A) | 6.3 |
| Methyl isobutyl ketone | 11.2 |
| Pigment (Marcy Red 2640) | 2.1 |
| Xylene | 11.2 |
| Hydrophobic colloidal silica (Nalco CD–100) | .05 |

| Material.—(B) Continuous phase: | Percent by weight |
|---|---|
| Water | 28.22 |
| Gum arabic | 5.9 |
| Polyvinyl alcohol | .3 |
| Triton X–200 (28% active) | 14.0 |
| Hydrophilic colloidal silica (Nalco D–1990 =15% solids) | 20.7 |
| Deodorant | 0.03 |

A grind is made first with the resin, methyl isobutyl ketone and pigment in the following proportions:

| | Percent by weight |
|---|---|
| Resin | 36.3 |
| Methyl isobutyl ketone | 51.5 |
| Pigment | 12.2 |

The grind is added to the other materials making up the dispersed phase while the materials of the continuous phase are combined and then the composition A is dispersed into composition B.

The foregoing treating composition can be applied by a swab or by a sponge onto the surface of the imaged plate for lacquering the image and wetting out the surface prior to use for the production of copy by the normal lithographic processes.

It will be understood that changes may be made in the details of formulation and operation without departing from the spirit of the invention, especially as defined in the following claims.

We claim:

1. In the preparation of an imaged lithographic master in which an oleophilic, ink-receptive, water-repellent image is provided on a water-receptive, lithographic surface, the improvement of treating the surface of the imaged master with an aqueous dispersion in which the dispersed phase (A) contains as essential ingredients (1) an essentially water immiscible organic solvent, (2) a tinctorial agent, (3) hydrophobic colloidal silica, and (4) a resinous material dissolved in the organic solvent, and in which the continuous phase (B) contains as essential ingredients (1) water, (2) a water-soluble hydrophilic colloid, (3) a surface active agent, and (4) hydrophilic colloidal silica.

2. The method as claimed in claim 1 in which the materials are present in the aqueous dispersion in the following amounts:

| Material: | Range in percent by weight |
|---|---|
| Organic solvent | 10–40 |
| Tinctorial agent | .5–10 |
| Hydrophobic colloidal silica | .01–1.0 |
| Resinous material | 1–10 |
| Hydrophilic colloid | 1–10 |
| Surface active agent | .1–10 |
| Hydrophilic colloidal silica | .1–10 |
| Water | Remainder |

3. The method as claimed in claim 1 in which the materials are present in the aqueous dispersion in the following amounts:

| Material: | Range in percent by weight |
|---|---|
| Organic solvent | 20–30 |
| Tinctorial agent | 1.5–3 |
| Hydrophobic colloidal silica | .04–.06 |
| Resinous material | 5–7 |
| Hydrophilic colloid | 2–4 |
| Surface active agent | .1–4 |
| Hydrophilic colloidal silica | 2.5–5 |
| Water | Remainder |

4. A composition for the treatment of the imaged surface of the lithographic plate for improvement in image readability and in the number of clean copies that can be produced comprising an aqueous dispersion in which the dispersed phase (A) contains as its essential ingredients (1) an essentially water immiscible organic solvent, (2) a tinctorial agent, (3) hydrophobic colloidal silica, and (4) a resinous material dissolved in the organic solvent, and in which the continuous phase (B) contains as essential ingredients (1) water, (2) a water-soluble hydrophilic colloid, (3) a surface active agent, and (4) hydrophilic colloidal silica.

5. A composition as claimed in claim 4 in which the materials are present in the following amounts:

| Material: | Range in percent by weight |
|---|---|
| Organic solvent | 10–40 |
| Tinctorial agent | .5–10 |
| Hydrophobic colloidal silica | .01–1.0 |
| Resinous material | 1–10 |
| Hydrophilic colloid | 1–10 |
| Surface active agent | .1–10 |
| Hydrophilic colloidal silica | .1–10 |
| Water | Remainder |

6. A composition as claimed in claim 4 in which the materials are present in the following amounts:

| Material: | Range in percent by weight |
|---|---|
| Organic solvent | 20–30 |
| Tinctorial agent | 1.5–3 |
| Hydrophobic colloidal silica | .04–.06 |
| Resinous material | 5–7 |
| Hydrophilic colloid | 2–4 |
| Surface active agent | .1–4 |
| Hydrophilic colloidal silica | 2.5–5 |
| Water | Remainder |

7. A composition as claimed in claim 4 in which the organic resinous material comprises the condensation polymerization product of epichlorohydrin and a Novolak of ortho-cresol-formaldehyde.

References Cited

UNITED STATES PATENTS

| | | | |
|---|---|---|---|
| 2,754,279 | 7/1956 | Hall | 101—149.2 X |
| 2,872,428 | 2/1959 | Schroeder | 260—29.2 |
| 3,028,804 | 4/1962 | Neugebauer et al. | 101—149.2 |
| 3,139,825 | 7/1964 | Connolly et al. | 101—149.2 |
| 3,231,377 | 1/1966 | Dickinson et al. | 96—33 |
| 3,234,873 | 2/1966 | Miller | 101—149.2 |

ROBERT E. PULFREY, *Primary Examiner.*

J. A. BELL, *Assistant Examiner.*